United States Patent [19]

Magoolaghan

[11] Patent Number: 4,998,437
[45] Date of Patent: Mar. 12, 1991

[54] UNIVERSAL METHOD AND APPARATUS FOR TESTING CLUTCHES AND BANDS WITHIN AN AUTOMATIC TRANSMISSION

[76] Inventor: Jack Magoolaghan, 81 8th Ave., Kings Park, N.Y. 11754

[21] Appl. No.: 481,987

[22] Filed: Feb. 15, 1990

Related U.S. Application Data

[63] Continuation-in-part of Ser. No. 138,793, Dec. 28, 1987, abandoned.

[51] Int. Cl.⁵ .......................................... G01M 15/00
[52] U.S. Cl. .................................................. 73/118.1
[58] Field of Search ..................... 73/118.1, 162, 168, 73/40, 40.7, 49.7, 49.8

[56] References Cited

U.S. PATENT DOCUMENTS

| | | | |
|---|---|---|---|
| 2,911,822 | 11/1959 | Frazier et al. | 73/49.7 |
| 2,918,822 | 12/1959 | Mann, Jr. | 73/118.1 |
| 3,213,674 | 10/1965 | Salcido et al. | 73/118.1 |
| 3,273,384 | 9/1966 | Flaugher | 73/118.1 |
| 3,389,600 | 6/1968 | Rau | 73/118.1 |
| 3,967,495 | 7/1976 | Wesner et al. | 73/118.1 |
| 4,244,209 | 1/1981 | Ceramicoli | 73/49.8 |
| 4,356,724 | 11/1982 | Ayoub et al. | 73/118.1 |

FOREIGN PATENT DOCUMENTS

| | | | |
|---|---|---|---|
| 0769386 | 10/1980 | U.S.S.R. | 73/118.1 |
| 2019007 | 10/1979 | United Kingdom | 73/730 |

Primary Examiner—Robert Raevis
Attorney, Agent, or Firm—Dilworth & Barrese

[57] ABSTRACT

A method and apparatus for testing clutches and bands in an automatic transmission including a test station having a plurality of gauges, a hose member connecting the test station with the transmission, and an adaptor plate for replacing a valve body on the transmission to be tested. The test station includes a fluid reservoir, a pump, a pressure regulator and a filter assembly for pumping the fluid through the hose member to the transmission. A reducing means is provided in-line in the hose member adjacent a first pressure gauge at the test station, and a second pressure gauge is provided in-line in the hose member adjacent the adaptor plate which is mounted on the transmission. The adaptor plate includes a plurality of plugs corresponding to the apply and release points of the clutch/band assembly to be tested in the transmission.

26 Claims, 2 Drawing Sheets

UNIVERSAL METHOD AND APPARATUS FOR TESTING CLUTCHES AND BANDS WITHIN AN AUTOMATIC TRANSMISSION

CROSS-REFERENCE TO RELATED APPLICATIONS

This application is a Continuation-in-Part application of application Ser. No. 138,793, filed Dec. 28, 1987, now abandoned.

BACKGROUND OF THE INVENTION

1. Field of the Invention

The present invention relates to a method and apparatus for testing clutches and bands in a vehicle transmission, and more particularly relates to a method and apparatus for testing a vehicle transmission which enables a technician to test the transmission unit under fluid pressure to simulate normal operating pressure conditions while the transmission is actually at rest in a non-running condition, whether the transmission is installed in the vehicle or removed for rebuilding or repairs.

2. Description of the Prior Art

Numerous transmission testing devices have been provided in the art for testing the working parameters of a transmission. These devices are adapted for coupling to the transmission housing and are usually constructed to include test plugs on the exterior to provide a means to operatively engage the test device to the transmission. These test devices enable technicians to determine the conditions at a particular band or clutch combination, and generally provide for analysis of the transmission only while the vehicle engine is running or under conditions simulating normal running condition. The problem with this type of test apparatus is that the data which the test yields is pure result with no indication of the cause, and while a technician may determine that a problem exists, the cause of the problem still must be further investigated, usually in furtherance of the trial and error method employed with these devices.

Identifying the cause of a problem using these prior art methods and devices generally requires additional and elaborate "process of elimination" diagnostic procedures because there is no means to attempt to isolate the individual components of the transmission for separate evaluation. It is most often impossible to correctly identify an internal condition or problem in the transmission in this way.

Internal components, such as the clutches and bands within the transmission, may be tested and analyzed based on the amount of fluid pressure applied and the ability of these parts to hold the pressure. The working life of the transmission itself can be predicted in part by the amount of fluid pressure which each individual clutch/band is able to maintain after application and initial leakdown.

While these devices may be suitable for the particular purpose to which they address, they would not be as suitable for the purposes of the present invention as hereinafter described.

U.S. Pat. No. 3,967,495 to Wesner et al. discloses a diagnostic instrument for detecting and locating malfunctions in a pneumatic circuit such as the circuit which controls a transmission in response to movement of an operator shift lever. The instrument tests the pneumatic control circuit to determine if appropriate pressures are present at key points as required along the various points in the circuit. Compressed air is supplied through the test instrument to test the circuit between the shift lever and the transmission. This type of device does not test the clutches and bands of the transmission itself, but rather uses compressed air to test the pneumatic lines between the shifting mechanism and the transmission. A specific disadvantage of this system exists in the use of compressed air to test the pressure at various points in the control circuit. Minute leaks may go undetected, and while the gauges may be sensitive enough to indicate a pressure drop corresponding to a leak in the line, it may be impossible to pinpoint the location of the leak since only air will be emitted from the leaking location. Furthermore, it is apparent that this testing instrument is for use on a transmission that has been removed from a vehicle and the transmission must be operated to simulate conditions of normal operation.

U.S. Pat. No. 4,356,724 to Ayoub et al. discloses an apparatus and method for testing transmissions that have been removed from the vehicle. A base is provided to receive the transmission and the transmission is operated to simulate normal operating conditions to test whether the transmission is shifted within the prescribed limits set by the manufacturer of the transmission. Variable speed drive means are provided for rotating the input shaft of the transmission under test and a load means is provided to load the output of the transmission during the test. Fluid pressure is monitored by a pressure sensor and an input speed sensor and an output speed sensor are provided for monitoring the input and output speed.

U.S. Pat. No. 2,918,822 to Mann, Jr. discloses a test bench and apparatus for testing automatic transmissions that have been removed from a vehicle. Pressure gauges may be provided to determine pressure within the transmission, and the transmission is operated to simulate normal operating conditions during operation of the test. This device is used primarily to check the complete shift pattern of the transmission to test for slippage between the shafts.

U.S. Pat. No. 3,273,384 to Flaugher discloses a device for testing an automatic transmission of a car that is mounted within the vehicle. The test device includes a series of rollers so that the vehicle may be operated in a normal manner so that the wheels actually rotate and the transmission is driven in a normal manner. The device may also be connected to the vehicle so that the vehicle may be road tested while the transmission is being tested.

U.S. Pat. No. 3,213,674 to Salcido et al. discloses a tool for testing fluid tight seals such as the clutch plate seals in clutch drums of automatic transmissions of automobiles. Air or hydraulic fluid may be admitted under pressure to the individual clutch plate to test for leakage of the clutch plate seals. It is apparent that the clutch plate must be removed from the transmission prior to testing using this device, and it is apparent that the transmission must be disassembled to facilitate use of this tool.

The novel apparatus for testing clutches and bands within an automatic transmission of the present invention obviates the disadvantages of the prior art and provides an efficient and easy to use testing instrument which allows for quick, accurate testing of a transmission whether the transmission is mounted in a vehicle or removed from the vehicle for repairs. The device controls the flow rate of a fluid which travels through the device to determine the percentage of leakage or retention of pressure within each individual clutch or band of the transmission which is under test. The transmission is testing in a static, non-operating condition, which allows the transmission to be tested in the vehicle without having to operate the vehicle, but at the same time testing for leakage or deterioration of each individual band and clutche.

SUMMARY OF THE INVENTION

The present invention eliminates or substantially ameliorates the disadvantages encountered in the prior art through the provision of a testing apparatus for testing and evaluating the bands and clutches in an automatic transmission which allows for the test to be performed on the transmission whether the transmission is mounted in a vehicle or removed from the vehicle. In addition, leakage at various points in the transmission may be determined, as well as deterioration of the bands and clutches which can be determined by a comparison of pressure readings at gauges provided with the device.

The apparatus of the present invention essentially consists of a pressure hose system and an adaptor plate which is mounted to the transmission in replacement of the valve body, which is removed prior to the test. A sealing gasket may be provided at the adaptor plate to sealingly mount the plate to the transmission. The adaptor plate is provided with a plurality of plug members for coupling to the hose member in fluid communication therewith. The hose member is provided with pressure gauges and with an in-line reducing member which reduces the inner diameter of the hose at an end of the hose remote from the transmission.

In a preferred embodiment, a test station is provided which includes a plurality of gauges including pressure gauges, temperature gauges and data recording means. The test station consists essentially of a housing and a gauge panel, and a fluid pump and filter and pressure regulator is arranged within the housing. The hose member is connected to the test station at an end of the hose near the reducing member, and a second end of the hose is connected to a plug member of the adaptor plate at the transmission. Adjacent to the end of the hose connected to the adaptor plate, is provided a pressure gauge in-line with the hose.

In use according to method of the invention, a fluid medium such as aromatic transmission fluid is pumped through the rest station through the hose and the reducing means. Pressure is read at a gauge positioned on the gauge panel of the test station which gives an initial reading of the pressure at which the fluid flows before the reducing means. The fluid is pumped through the hose member, through the second pressure gauge, and through the plug members of the adaptor plate to the transmission. The plurality of plug members correspond to the number of "apply" and "release" points to test the individual clutches and bands in the transmission. The fluid flows through the plug members to test the individual clutches and bands, and a comparison is made between the pressure at the gauge panel and the pressure at the pressure gauge adjacent the adaptor plate. The device of the present invention controls the rate of flow of the fluid medium to determine the percentage of leakage and/or the retention of pressure within each individual clutch or band.

In a second embodiment, a hose member is provided with a pressure gauge at a first end, and with a reducing means to reduce the inner diameter of the hose adjacent to the first pressure gauge. A second pressure gauge is provided at the second end of the hose, and an adaptor plate is provided to replace the valve body on the transmission during the test. The adaptor plate is also provided with the plurality of plug members so that the hose may be coupled to the adaptor plate adjacent to the second pressure gauge. A pressure source is provided for pressurizing automatic transmission fluid so that the fluid may flow through the first pressure gauge, through the reducing means, through the second pressure gauge and the plug members of the adaptor plate to the transmission. A comparison is made between the pressure at the first gauge and the pressure at the second gauge, and the percentage of leakage and/or retention of pressure may again be calculated.

Accordingly, a primary object of the present invention is to provide a method and apparatus for testing clutches and bands in a transmission that will overcome the shortcomings of the prior art devices.

Another object is to provide a method and apparatus for testing clutches and bands that will isolate all possible trouble causes in order to determine what is actually causing the problem in the transmission or related components.

Another additional object is to provide a method and apparatus for testing clutches and bands that can test the transmission in or out of the vehicle.

A further objection is to provide a method and apparatus for testing clutches and bands that is simple and easy to use.

A still further object is to provide a method and apparatus for testing clutches and bands that is economical in cost to manufacture and has the ability to test the transmission unit and to maintain absolute control of the fluid flow and pressure to the transmission unit without reliance on hydraulic pumps or governors within the transmission device or on the fluid passages within the valve body.

Yet another object is to provide a device for testing a plurality of clutches and bands within a vehicle transmission unit having a valve body which includes an adaptor member attached to the vehicle transmission unit in place of the valve body.

Still another object is to provide a device wherein the adaptor member includes a plate being in the same general configuration as the valve body, the plate having a plurality of holes therein so as to be attached to the vehicle transmission unit, and at least one connector fluidly affixed to the plate so as to communicate with the clutches and bands within the vehicle transmission unit.

Yet another object is to provide a device wherein the adaptor member may a gasket placed between the plate and the vehicle transmission unit so as to create a seal therebetween when the plate is attached thereto.

Further objects of the invention will appear as the description proceeds.

BRIEF DESCRIPTION OF THE DRAWINGS

The foregoing objects and other features of the invention will become more readily apparent and may be understood by referring to the following detailed description of an illustrative embodiment of the testing apparatus for testing clutches and bands in an automatic transmission, taken in conjunction with the accompanying drawings, in which.

DETAILED DESCRIPTION OF THE PREFERRED EMBODIMENTS

Figure 1:
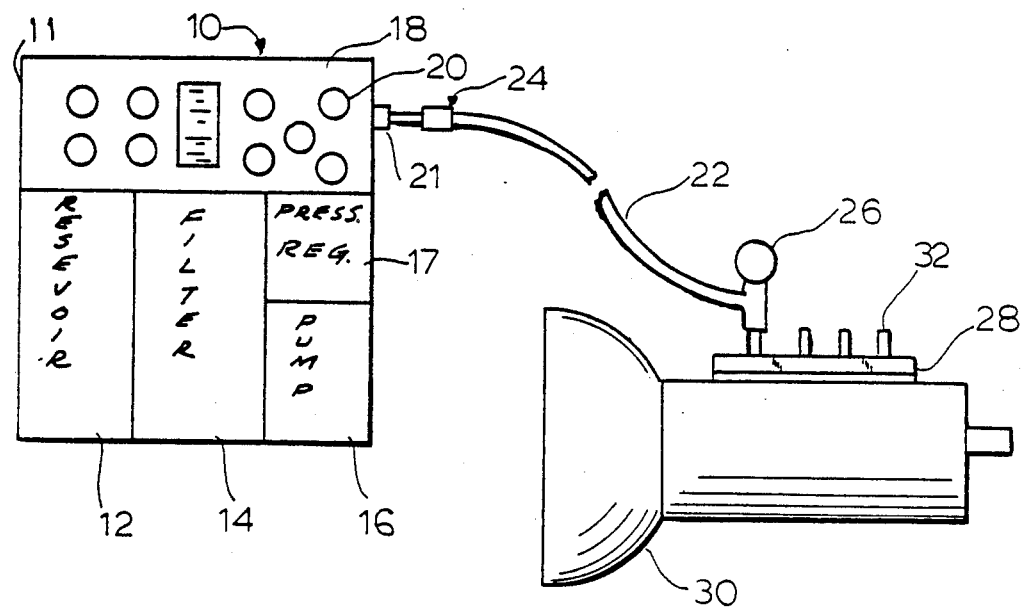
FIG. 1 illustrates a diagrammatic view of the apparatus of the present invention.

Referring now in specific detail to the drawings, in which identical reference numerals identify similar or identical elements throughout the several views, FIG. 1 shows a diagrammatic view of the present invention connected to a transmission to be tested. A test station 10 is provided which is portable and may be moved to a location where the transmission is to be tested, such as in a vehicle which is on a hydraulic lift at a service station or the like. The transmission 30 may be mounted in the vehicle, or may have been removed from the vehicle for repairs and positioned on a test bench (not shown). The test station 10 comprises a housing 11 which accomodates a fluid reservoir 12 which contains a fluid medium such as automatic transmission fluid. A filter 14 and pump assembly 16 and a pressure regulator 17 are provided for pumping the fluid through the test station to the transmission 30. A gauge panel 18 is provided which consists of plurality of gauges such as first pressure gauge 20, as well as additional pressure gauges and other gauges such as temperature sensors, flow meters, data recorders and the like. First pressure gauge 20 is preferably positioned adjacent outlet nipple or plug 21 which allows for connection of hose member 22 to the test station 10. Adjacent the connection point of hose member 22 at outlet plug 21 is provided an in-line reducing means 24 which reduces the inner diameter of hose member 22. Reducing means 24 is described in better detail below in connection with FIG. 3.

Hose member 22 also has provided at a second end a second pressure gauge 26 which is positioned in-line in the hose near the connection point with adaptor plate 28. Adaptor plate 28 is secured to transmission 30 in replacement of a valve body (not shown) which has been removed for the test. Hose member 22 is connected through chuck 46 as best seen in FIG. 2 to plugs 32.

Figure 2:
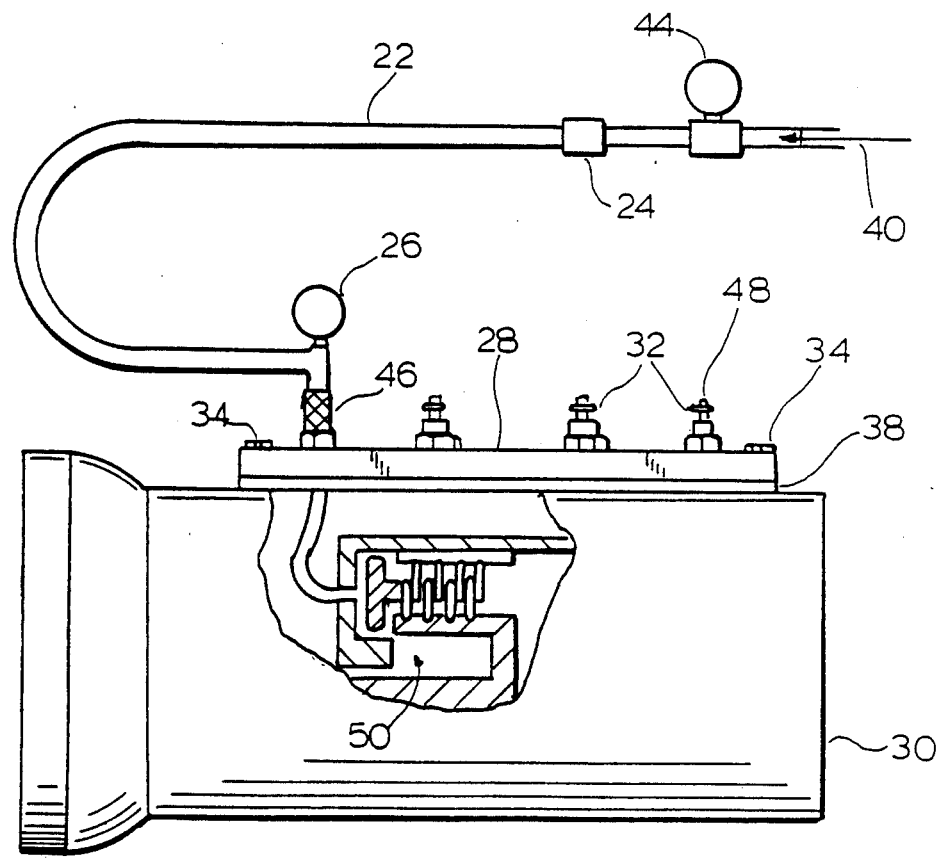
FIG. 2 illustrates a perspective view of a preferred embodiment of the present invention, showing a partial cut-away view of a transmission under test.

FIG. 2 shows an alternate embodiment of the present invention in which hose member 22 comprises the test apparatus. Hose 22 is connected at a first end 40 to a pressurized fluid source, which may be a pump or a fluid source pressurized by compressed air (not shown). Hose 22 is provided with an initial pressure gauge 44 which is positioned in-line adjacent the source end 40, and positioned next to the initial pressure gauge 44 is reducing means 24. Second pressure gauge 26 is positioned in-line adjacent the second end of the hose 22, where the hose is connected at chuck 46 to the nipple or plug assembly 48 provided on adaptor plate 28. Adaptor plate 28 is secured to transmission 30 by bolts 34 and replaces a valve body which has been removed from the transmission for the test. A plurality of plug members 32 are provided which correspond to the "apply" and "release" points corresponding to the individual bands and clutches to be tested.

As best seen in FIG. 2, hose 22 is connected to the adaptor plate at chuck 46 to plug 48 so that the hose member is in fluid communication with clutch-band assembly 50. Adaptor plate 28 is secured to the transmission, and in one embodiment, may be secured through gasket 38 by bolts 34 and is sealed to the transmission to prevent leaking by gasket 38. Pressurized fluid from the fluid source passes through initial pressure gauge 44 and reducing means 24 through hose 22 and second pressure gauge 26 to the adaptor plate 28. After passing through the adaptor plate to the clutch/band assembly 50, readings may be taken on the pressure gauges to determine leakage or deterioration of the clutch/band assembly 50.

Figure 3:
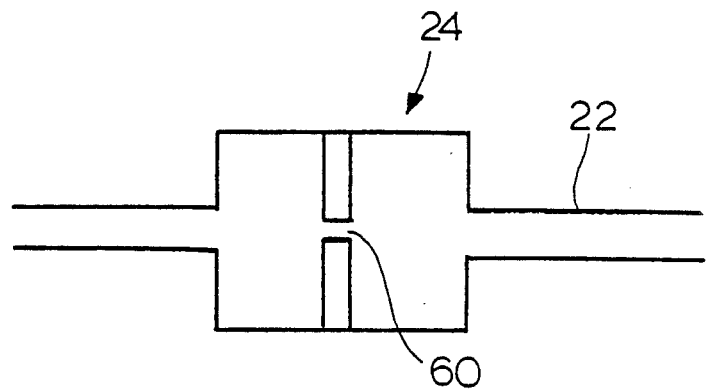
FIG. 3 shows a partial cut-away side view of the hose member and reducing means of the present invention.

FIG. 3 shows reducing means 24 positioned in-line in hose 22 in which orifice 60 reduces the inner diameter to restrict the flow of fluid through reducing means 24. Preferably, the inner diameter of orifice 60 is between 0.010 inches and 0.100 inches. In a preferred embodiment, the inner diameter of orifice 60 is 0.032 inches.

Figure 4:
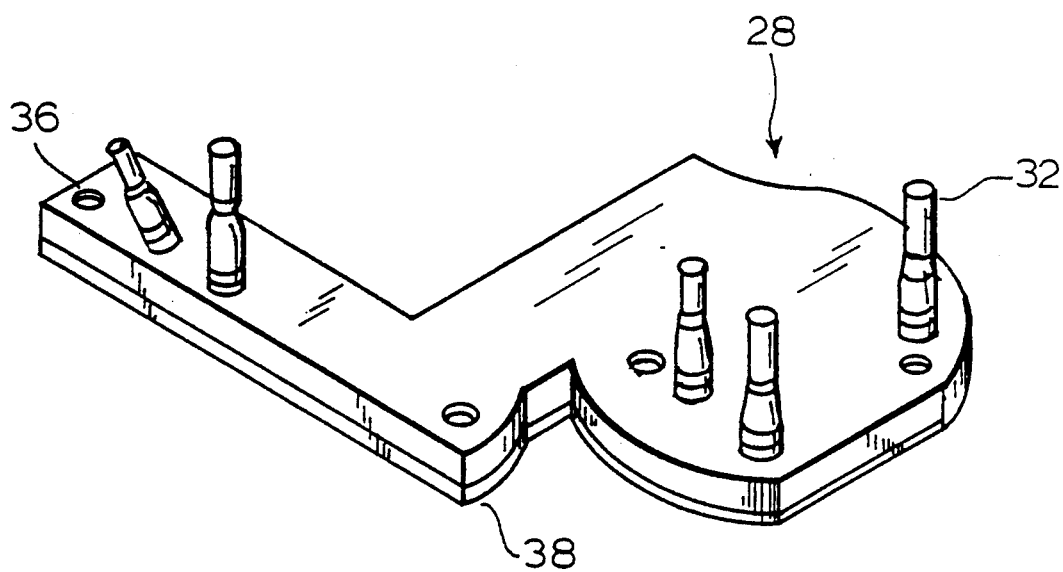
FIG. 4 is a perspective view of a typical adaptor member for use with the present invention.

FIG. 4 shows a typical adaptor plate 28 which is part of the test apparatus. Plugs 32 are provided to provide for fluid commuciation between the hose 22 and the clutch/band assembly 50 to be tested. Bolt holes 36 are provided so that bolts 34 may secure the adaptor plate 28 to the transmission 30, through the provision of a sealing gasket 38 as shown.

In use, a valve body (not shown) is removed from transmission 30 and adaptor plate 28 may be secured through sealing gasket 38 to the transmission by bolts 34. Hose member 22 is then secured at a first end to test station 10 and at a second end to a plug 32 on adaptor plate 28. Fluid is pumped from reservoir 12 through filter 14 by pump 16 through pressure regulator 17 to hose 22 which is connected at outlet nipple 21. First pressure gauge 20 on gauge panel 18 indicates an initial reading of the pressure at which the fluid, is flowing. The fluid preferably automatic transmission fluid, flows through reducing means 24 which controls the flow of the fluid through hose 22. The fluid flows through hose 22 to pressure gauge 26, and through a plug member 32 to the clutch/band assembly 50 to be tested. The flow rate is controlled by the reducing means 24 so that a comparison may be made between the pressure at first pressure gauge 20 and second pressure gauge 26, so that a percentage of leakage based on the retention of flow within each individual clutch/band assembly 50 may be determined. The parameters which indicate deterioration of the clutch or band are determined experimentally, and the comparison between the initial pressure at the first pressure gauge 20 and the final pressure at the second pressure gauge 26 allows for the determination of retention of flow to determine problems associated with that clutch or band. After the pressure is released, the fluid is returned to the reservoir by a vacuum effect.

The present invention utilizes automatic transmission fluid as the fluid medium which allows the clutch/band assembly to be tested under conditions normally seen in the working operation of the transmission. After the first clutch or band is tested, chuck 46 is relocated to another plug 32 on plate 28 to test the next clutch/band assembly. The number of plugs provided correspond to the number of clutch/bands to be tested in that particular transmission. The plugs correspond to the apply and release points of the clutch/band assembly.

While the invention has been particularly shown and described with reference to the preferred embodiments, it will be understood by those skilled in the art that various variations and changes in form and detail may be made therein without departing from the scope and spirit of the invention. Accordingly, modifications and changes are to be considered within the scope of the invention.

What is claimed is:

1. An apparatus for testing bands and clutches of a transmission of a vehicle, said transmission being tested in a static, non-operating condition, said transmission having a plurality of bands and clutches and a removable valve body, said apparatus comprising:
    a test station remote from said transmission, said test station including a housing and having a gauge panel for displaying a plurality of gauges;
    a fluid pump and pressure regulator for pumping a fluid medium from a reservoir through said test station to said transmission;
    a connection member for fluidly connecting said test station to said transmission, said fluid medium flowing through said connection member;
    a reducing means for reducing an inner diameter of said connection member intermediate said test station and said transmission;
    an in-line pressure gauge positioned in said connection member intermediate said reducing means and said transmission; and
    an adaptor plate having means for mounting to said transmission; said plate being mounted to said transmission at a location corresponding to said valve body after said valve body has been removed, said plate being provided with a plurality of plug members for coupling to said connection member.

2. An apparatus according to claim 1, wherein said pump forces said fluid medium through a filter, said pressure regulator and said test station to obtain an initial reading at said plurality of gauges, said pump further forcing said fluid medium through said reducing means, said connection member, and said in-line pressure gauge to said transmission to obtain a final reading at said in-line pressure gauge to evaluate said bands and clutches in said transmission.

3. An apparatus according to claim 1, wherein said fluid pump, pressure regulator and reservoir are positioned within said housing of said test station.

4. An apparatus according to claim 1, wherein said test station is portable such that said transmission may remain within a vehicle during testing.

5. An apparatus according to claim 1, wherein said gauge panel of said test station includes a plurality of pressure gauges, temperature gauges and data recording means.

6. An apparatus according to claim 1, wherein said connection member comprises a hose provided at its ends with coupling members for coupling at a first end to said test station and a second end to said adaptor plate.

7. An apparatus according to claim 1, wherein said reducing means is positioned adjacent an end of said connection member near said test station.

8. An apparatus according to claim 1, wherein said fluid medium is automatic transmission fluid.

9. An apparatus according to claim 1, wherein said adaptor plate is mounted to said transmission through a sealing means, said sealing means comprising a gasket.

10. An apparatus according to claim 1, wherein said plug members corresponding in number to a number of bands and clutches to be tested.

11. An apparatus according to claim 10, wherein said plug members correspond in number to apply and release points of the number of bands and clutches to be tested.

12. An apparatus according to claim 1, wherein said fluid medium is returned to said reservoir after testing.

13. An apparatus for testing bands and clutches of a transmission of a vehicle, said transmission being tested in a static, non-operating condition, said transmission having a plurality of bands and clutches and a removable valve body, said apparatus comprising:
    a pressure source for pressurizing a fluid medium;
    a connection member linking said pressure source and said transmission;
    a reducing means positioned in said connection member to reduce the inner diameter of said connection member; and
    an adaptor plate, said adaptor plate being mountable to said transmission in place of said removable valve body, said adaptor plate being provided with a plurality of plug members for coupling to said connection member;
    wherein said connection member has a first pressure gauge positioned at a first end intermediate said pressure source and said reducing means, and a second pressure gauge positioned at a second end intermediate said adaptor plate and said reducing means.

14. An apparatus according to claim 13, wherein said pressure source comprises a compressed air source for pressurizing said fluid medium.

15. An apparatus according to claim 13, wherein said pressure source comprises a fluid pump.

16. An apparatus according to claim 13, wherein said reducing means is positioned adjacent said first end of said connection member near said pressure source and said first pressure gauge.

17. An apparatus according to claim 13, wherein said second pressure gauge is positioned remote from said reducing means and adjacent said adaptor plate at said second end of said connection member.

18. An apparatus for testing bands and clutches in a transmission of a vehicle, said transmission being tested in a static, non-operating condition, said transmission having a plurality of bands and clutches and a removable valve body, said apparatus comprising:
    a hose member having a constant inner diameter;
    a first pressure gauge positioned at a first end of said hose member;
    a second pressure gauge positioned at a second end said of hose member;
    a reducing means positioned in-line in said hose member and between said pressure gauges near said first pressure gauge, said reducing means reducing the inner diameter of said hose member; and
    an adaptor plate member mountable on said transmission in place of said removable valve body, said plate having a plurality of plug members for securing said hose member at said second end;
    wherein said hose member fluidly connects a pressurized fluid source and said transmission, such that said bands and clutches may be tested and evaluated by comparison of a fluid pressure at said first pressure gauge with a fluid pressure at said second pressure gauge.

19. An apparatus according to claim 18, wherein said reducing means controls the flow of fluid at said first pressure gauge so that said fluid pressure at said second pressure gauge may be compared to said fluid pressure at said first pressure gauge to determine a percentage used to evaluate said bands and clutches.

20. An apparatus according to claim 19, wherein said reducing means controls the flow rate of said fluid to determine by comparison of said fluid pressure at first pressure gauge to said fluid pressure at said second pressure gauge the percentage of fluid leakage or fluid retention of said clutch and band under test.

21. A method of testing and evaluating bands and clutches in a transmission, said transmission being tested in a static, non-operating condition, said transmission having a plurality of bands and clutches and a removable valve body, said method comprising the steps of:

removing said valve body from said transmission;

securing an adaptor plate to said transmission in place of said valve body, said adaptor plate corresponding in shape to said valve body for sealingly mounting said plate to said transmission, said adaptor plate having a plurality of plug members corresponding to a number of bands and clutches to be tested;

connecting a hose member at one end to one of said plug members to test a band/clutch associated with said one plug member, said hose member having a first pressure gauge at a first end and a second pressure gauge at a second end, said hose member further being provided with a reducing member positioned in-line in said hose member adjacent said first pressure gauge to reduce the inner diameter of said hose member;

connecting said hose member at a second end to a pressurized fluid source;

pumping said pressurized fluid through said hose member, reducing member, pressure gauges and adaptor plate to apply pressure to said bands and clutches; and comparing the fluid pressure at said second pressure gauge to the fluid pressure at said first pressure gauge and calculating the percentage of change between said gauges to evaluate said bands and clutches.

22. A method according to claim 21, wherein said transmission may be tested while mounted in a vehicle or after having been removed from said vehicle.

23. A method according to claim 21, wherein said plug members of said adaptor plate provide for fluid communication between said hose member and said bands and clutches of said transmission.

24. A method according to claim 21, wherein said first pressure gauge is part of a test station which includes said pressurized fluid source.

25. A method according to claim 21, wherein said second end of said hose member is connected to said adaptor plate at said plug members, such that said second pressure gauge is positioned adjacent said adaptor plate.

26. A method according to claim 21, including the step of controlling the flow rate of said pressurized fluid so that said step of comparing fluid pressure between said first and second pressure gauges may determine the percentage of fluid leakage or retention of fluid at said clutch/band under test.

* * * * *